United States Patent

[11] 3,593,010

| Inventor | Robert W. Sampson |
| | Arlington Heights, Ill. |
| Appl. No. | 863,801 |
| Filed | Oct. 6, 1969 |
| Patented | July 13, 1971 |
| Assignee | Universal Oil Products Company |
| | Des Plaines, Ill. |

ANALOGUE INTEGRATION APPARATUS WITH COMPENSATION FOR DRIFT
9 Claims, 2 Drawing Figs.

| U.S. Cl. | 235/183, |
| | 328/127, 235/179, 235/151.35, 346/13 |
| Int. Cl. | G06g 7/18 |
| Field of Search | 235/183, |
| | 150.51, 179, 151.3, 151.35, 151.34, 151.12; |
| | 328/127, 258; 307/229; 73/23.1; 246/13, 23, 25; |
| | 340/347 |

[56] References Cited
UNITED STATES PATENTS

| 3,051,898 | 8/1962 | Eynon | 346/13 X |
| 3,185,820 | 5/1965 | Williams et al. | 235/151.35 UX |
| 3,242,327 | 3/1966 | Burk et al. | 235/151.35 X |
| 3,259,733 | 7/1966 | Klaver et al. | 235/183 X |
| 3,475,600 | 10/1969 | Spence | 235/151.35 X |
| 3,486,011 | 12/1969 | Woodard et al. | 346/13 X |

Primary Examiner—Malcolm A. Morrison
Assistant Examiner—Joseph F. Ruggiero
Attorneys—James R. Hoatson, Jr. and Philip T. Liggett ABSTRACT: A primary signal network which compensates for drift error developed in a voltage-integrating network operating on the primary signal voltage. A compensating voltage is developed in the primary signal network independent of the normal primary voltage signal. This compensating voltage offsets the drift voltage and improves the accuracy of the integration of the primary signal voltage over the period of measurement and integration.

INVENTOR:
Robert W. Sampson

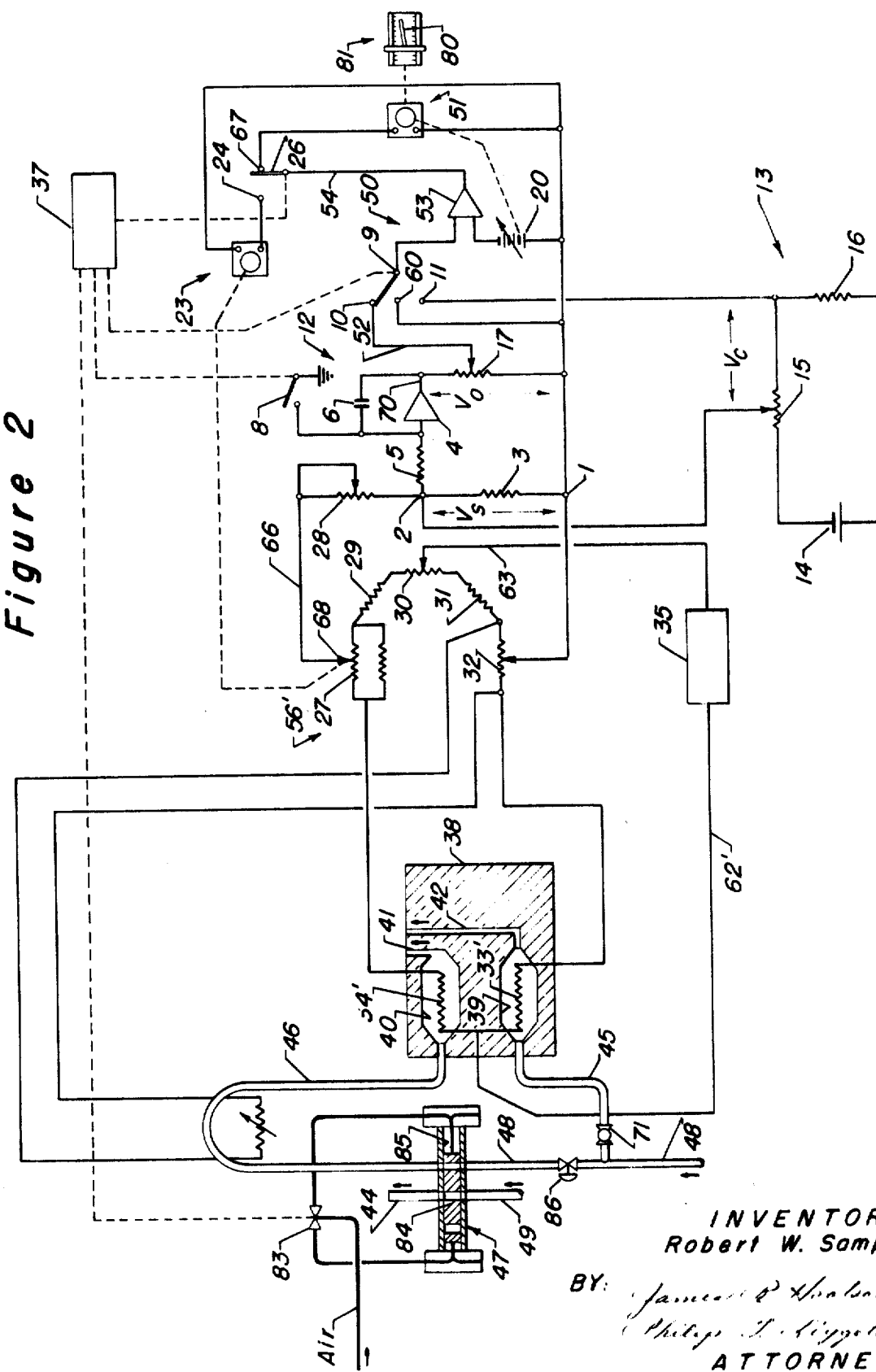

ANALOGUE INTEGRATION APPARATUS WITH COMPENSATION FOR DRIFT

This invention relates to an analogue integration apparatus in which a primary signal network compensates for drift error developed in a voltage-integrating network operating on the primary signal voltage. A compensating voltage is developed in the primary signal network independent of the normal primary voltage signal. This compensating voltage offsets the drift voltage and improves the accuracy of the integration of the primary signal voltage over the period of measurement and integration.

Fundamental to this invention is the concept of an operational amplifier. An operational amplifier is an amplifier that activates a passive network to form an active analog. In an operational amplifier circuit a voltage potential across two source points represents an independent variable for a mathematical function of which computation in some form is desired. The operational amplifier circuit effectively performs this computation by operating on the source or primary signal voltage with a function so that the output voltage is an analog signal proportional to the product of the source voltage and function. One such function is the function of integration. An operational amplifier circuit which performs this function will hereinafter be referred to as a voltage-integrating network.

Operational amplifiers are characterized as having an extremely high direct current and low frequency gain, so that the input signal required for full output is generally negligible, both in current and in voltage. Ideally, there is no current flow into the operational amplifier as the amplifier is assumed to have an infinite input impedance. This assumption is necessary in designing a circuit with an operational amplifier to produce an analog measurement according to a specific function. In all operational amplifiers, however, there are certain departures from this ideal situation. While there are several types of errors introduced into the circuitry of the operational amplifier, some are of no consequence while others are extremely important in different applications, particularly in voltage-integrating networks. The error introduced when an operational amplifier is used in an integrating network over a substantial period of time is called drift. In particular configurations of integrator networks the output drift rate will be in the area of 500 microvolts per second. Over a 5 minute period the output voltage due to drift will be in the area of 150 millivolts. If the output is being read on a millivolt recorder it can be seen that a large error is introduced into the output reading, and in this situation 5 minutes may be considered a substantial period of time. In other instances the term "substantial period of time" must be considered in view of the quality of the operational amplifier, the accuracy of the output readings required, and the magnitude of errors introduced from other sources.

Drift may be considered to be a slow change in the output voltage according to the time of the circuit operation. Drift, for the purposes of this invention will be understood to refer only to output voltage drift when the source, or primary signal voltage, is zero.

Currently, compensation for drift may be made by introducing at the output of a voltage-integrating network a direct current voltage approximately equal in magnitude and opposite in polarity to drift. Alternatively, the integration register or recorder to which the voltage-integrating network is connected may be biased by an amount which will nullify the effect of the drift voltage. The magnitude of voltage registered or recorded will thereby approximate the magnitude of output voltage which would occur in the absence of drift. In either case, the conventional methods of correction cannot be used for some purposes, such as for quantitative measurement of percentages of total components of a fluid stream. This is because of the need to normalize the measurement in such an application for the proper control of a fractionating column used to refine petroleum products. It is in this application that the advantages of this invention are most desirable and the deficiencies of existing drift-compensation systems most apparent.

It is an object of the present invention to compensate for drift voltage in an integrating network without introducing an external voltage into the network during or at the end of the integration cycle. Instead, tee primary signal voltage to the amplifier is modified to compensate for drift during the integration cycle.

Another object of the invention is to reduce the number of components in the voltage-integrating circuit and thereby keep to a minimum the potential inaccuracies in operation which result from a more complex circuit. This is achieved in the present invention since the primary signal network itself is used to compensate for drift and there is no exterior compensating voltage present during the integration cycle.

A further object of the invention relates to specific application of this invention. This invention has been applied with particular success in quantitatively measuring the percentage of each of the total components of a fluid stream. Such an application is particularly useful in determining the relative quantity of each petroleum product produced in a fractionating column during petroleum refining.

In broad aspect this invention is an analogue integration apparatus for integrating a primary signal with respect to time comprising: a primary signal network for generating a primary signal voltage and having second and first primary signal terminals connected to each other by a signal network resistor; a voltage-integrating network connected across said primary signal terminals and having an output voltage lead; a drift-compensating voltage source, for producing an electrical potential to offset drift developed in said voltage-integrating network, having a first compensating voltage lead connected to said second primary signal terminal, and having a second compensating voltage lead; an output amplifier system having an output amplifier with a command signal output lead terminating in a two-way switch, and a variable voltage source connected in series with said output amplifier between said first primary signal terminal and a three-way switch that is connectable to said output voltage lead, said first primary signal terminal; and said second compensating voltage lead; voltage-adjusting servomotor connectable to said two-way switch and connected to said first primary signal terminal and operably connected to said variable voltage source, whereby said variable voltage source is adjustable to effect a zero voltage input into said output amplifier; and a primary signal servomotor connected to said first primary signal terminal and connectable to said two-way switch and operably connected to said primary signal network, whereby said primary signal network is adjustable to effect a voltage differential between said second and first primary signal terminals equal and opposite in polarity to voltage at said drift-compensating voltage source.

While there are a number of different voltage-integrating network configurations which can be used to integrate voltage with respect to time, one of the simplest and most effective is comprised of a resistor followed by an operational amplifier and a capacitor, connected in parallel with each other, and a switch leading to ground connected to said resistor to bypass said operational amplifier and said capacitor. In any event, this invention is applicable only to voltage-integrating networks which utilize one or more operational amplifiers. As in all voltage-integrating networks, any resistors, operational amplifiers, and capacitors used to make up a voltage-integrating network for use with this invention must have compatible electrical properties so as to maintain the output voltage within the limits of the operational amplifier, and so as to effectively integrate input voltage across the voltage range within which the input voltage or primary signal voltage is likely to occur.

The versatility of this invention is increased immensely if the drift-compensating voltage source used to offset the drift is adjustable. In this preferred case, the input voltage or primary signal voltage can be changed to meet varying values of drift which may occur under different environmental conditions. It should be noted, that in the operation of the analogue integration apparatus, the drift-compensating voltage source is present in the system only during the determination of the initial electrical conditions of the primary signal network at the start of each integrating period. The drift-compensating voltage source is electrically isolated from the primary signal network during the times that the voltage-integrating network is producing measured signals in the process of integrating the input voltage with respect to time.

In the preferred form of this invention, the primary signal network is an electrical bridge having two branches. The signal network resistor is connected to the second and first primary signal terminals between the branches of the bridge, thereby dividing each branch of the bridge into two legs. The most widely used form of such a bridge is the well-known Wheatstone bridge. Other forms of bridges which will perform in this invention equally as well include, but are not limited to, slide rail bridges and Kelvin double bridges. The primary signal network used in this invention is not necessarily some form of bridge, however. It may just as well be some other electrical device for producing a primary signal voltage, such as a potentiometer.

The integrated voltage developed in the analogue integration apparatus of this invention is normally converted to a meaningful form by being recorded on some electrical or mechanical register. For example, an attenuation network is frequently connected across the first primary signal lead and the output voltage lead to decrease the output voltage strength to the proper level. A pen recorder is connected to the attenuation network and the integral with respect to time of voltage from the primary signal network is graphically recorded. If paper is fed through the recorder at a constant rate and the height of the pen tracing increases in proportion to the output voltage, the slope of the pen tracing will indicate the primary signal voltage at any given time while the height of the pen tracing will reflect the integral of the primary signal voltage over period of time at a point in time.

The various features and several embodiments of this invention are more clearly illustrated in the accompanying drawings in which:

FIG. 2 is an apparatus for quantitatively measuring the percentage of each component of a fluid stream utilizing a modification of the embodiment of this invention depicted in FIG. 1.

Figure 1:
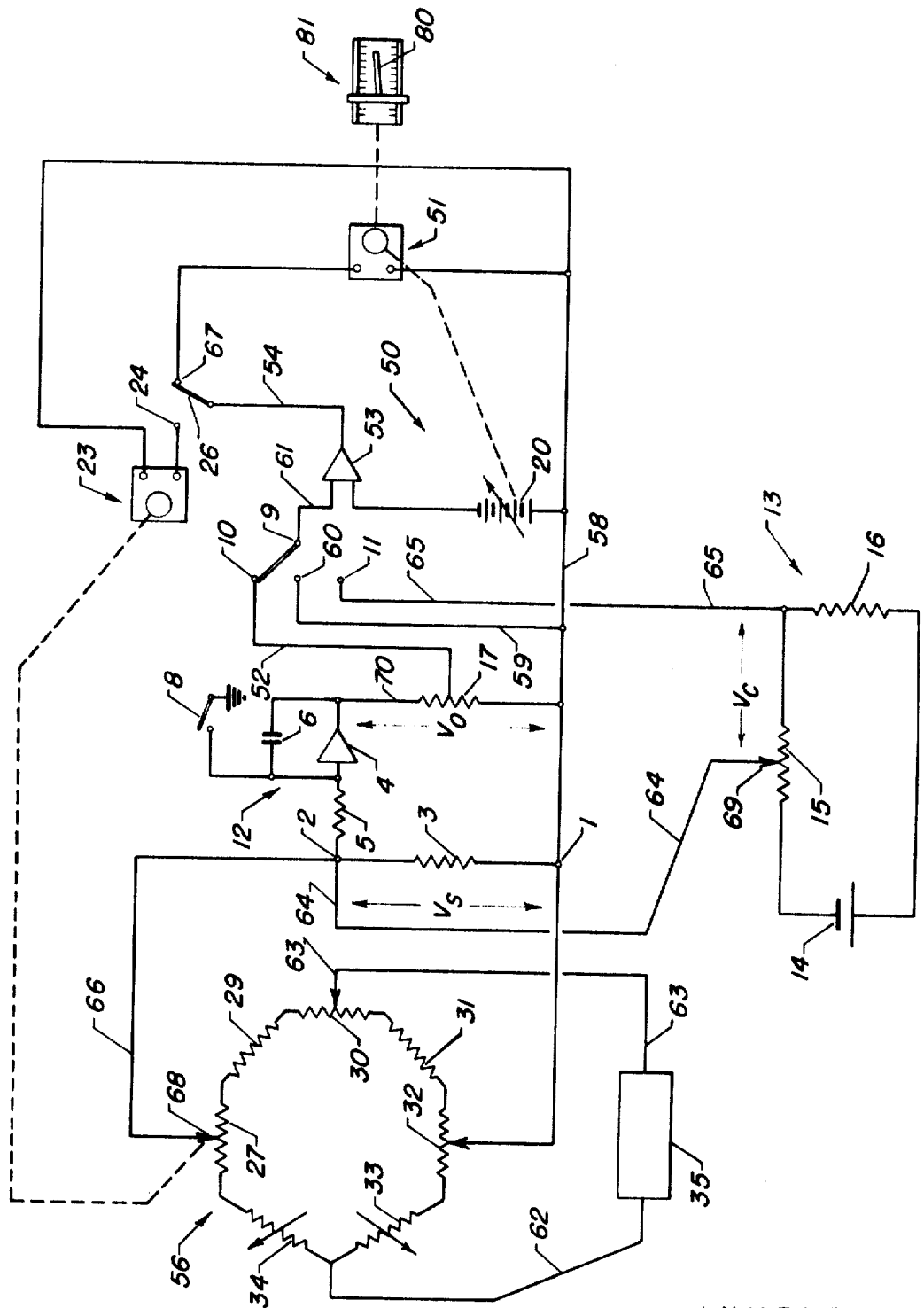
FIG. 1 is a schematic diagram of a preferred embodiment of this invention.

Referring now to FIG. 1 there is shown an analogue integration apparatus for integrating a primary signal with respect to time. This apparatus is comprised of several major components. These components are: a primary signal network 56, a voltage-integrating network 12, a drift-compensating voltage source 13, an output amplifier system 50, a voltage-adjusting servomotor 51, and a primary signal servomotor 23. Primary signal network 56 is one form of a Wheatstone bridge having second and first branches and is used to generate a primary signal voltage. Second and first primary signal terminals 2 and 1 respectively are connected to each other by signal network resistor 3 and are positioned in said second and first branches respectively and divide each branch into legs. One leg of the second branch is comprised of a variable resistor 34 and the adjacent part of resistor 27. Similarly, the adjacent leg of the first branch of bridge 56 is comprised of a variable resistor 33 and the adjacent part of resistor 32. A wire 62 is connected to the bridge 56 between these two adjacent legs of the bridge and is connected to a power source 35. The remaining portion of resistor 27, a fixed resistor 29, and the adjacent portion of resistor 30 comprise the other leg of the second branch of bridge 56. The remaining portions of resistors 30 and 32 along with fixed resistor 31 comprise the other leg of the first branch of bridge 56. These latter legs are adjacent to each other and a wire 63 from power source 35 is connected to the bridge 56 therebetween.

The voltage-integrating network 12 is comprised of a resistor 5 followed by an operational amplifier 4 and a capacitor 6 connected in parallel with each other. A switch 8 leading to ground is connected to resistor 5 to bypass operational amplifier 4 and capacitor 6. Voltage-integrating network 12 is connected across the primary signal terminals 2 and 1 and has an output voltage lead 70. As can be seen from FIG. 1, output lead 70 is connectable to a three-way switch 9 by way of resistor 17, wire 52, and contact 10. In the voltage-integrating network 12, there is a current flow through operational amplifier 4 and a feedback through capacitor 6 when an electrical potential exists across terminals 2 and 1. Voltage $V_0$ is the voltage differential between output lead 70 to first source terminal 1. While switch 8 is open, voltage $V_0$ will decrease whenever positive voltage exists between second primary signal network terminal 2 and first primary signal network terminal 1. Conversely, voltage $V_0$ will increase whenever a negative voltage exists between second primary signal network terminal 2 and first primary signal network terminal 1. $V_0$ remains constant whenever $V_s$, the primary signal network voltage, is equal to 0. The result is that $V_0$ represents the cumulative voltage with respect to time that exists between primary signal network terminals 2 and 1. That is, $V_0$ is the integral of $V_s$ with respect to time multiplied by a constant. $V_0$ will continue to compile the integral of $V_s$ until the operational amplifier circuit is reset by means of switch 8. When the voltage-integrating network is in the integrating mode, switch 8 is open. When it is desired to reset the voltage $V_0$ to zero, switch 8 is closed, the capacitor 6 is discharged to ground, and $V_0$ drops to zero.

The drift-compensating voltage source 13 is used to produce an electrical potential to offset drift developed in the voltage-integrating network 12. Drift-compensating voltage source 13 is comprised of a battery 14 in series with resistors 16 and 15. Resistor 15 may be used to create a variable voltage drop by virtue of first compensating voltage lead 64 which can be adjusted to bypass part of resistor 15. The effective compensating voltage $V_c$ applied to the system may be varied and the drift-compensating voltage source is thereby adjustable. The compensating voltage lead 64 of drift-compensating voltage source 13 is connected to the second primary signal terminal 2. A second compensating voltage lead 65 is connectable to the three-way switch 9 by way of contact 11.

The output amplifier system 50 is comprised of an output amplifier 53 having a command signal output lead 54 terminating in two-way switch 26, and a variable voltage source 20 connected in series with output amplifier 53 between the three-way switch 9 and the first primary signal terminal 1. It can be seen that switch 9 can engage contact 11 from second compensating voltage lead 65 of voltage source 13, contact 60 which is connected by wire 59 to first primary signal terminal 1, or output voltage lead 70 through contact 10, but no more than one of these contacts at the same time.

Voltage-adjusting servomotor 51 is connectable to two-way switch 26 and is connected to first primary signal terminal 1. Voltage-adjusting servomotor 51 is operably connected to the variable voltage source 20 and changes the variable voltage source 20 until the input to amplifier 3 is zero. The input to amplifier 53 will be zero only when voltage external to the output amplifier system 50 is exactly offset by the variable voltage source 20. The servomotor 51 varies the voltage put out by the variable voltage source 20, so that the input to output amplifier system 50 is always zero when the output amplifier system 50 is connected across the first primary signal lead 1 and the wire 52 by means of switch 9 and contact 10. The mechanical action of servomotor 51 positions a pen 80 above paper being fed at a constant rate through pen recorder 81. The pen 80 thereby traces a graphic record of the integral of the voltage with respect to time of the primary signal network voltage.

A primary signal servomotor 23 is connected to first primary signal terminal 1 and connectable to two-way switch 26 at contact 24. Servomotor 23 is operably connected to the primary signal network 56. Primary signal network 56 is thereby adjustable to change the voltage differential between second primary signal terminal 2 and first primary signal terminal 1. Initially this primary signal voltage is changed to be equal and opposite in polarity to the voltage $V_c$ at drift-compensating voltage source 13.

The operations of the analogue integration apparatus of FIG. 1 will now be considered from start to completion of a single cycle of operation. The voltage between terminal 2 and terminal 1 varies slowly over a period of time, so that any current flowing is direct current or current of very low frequency. The input voltage, or primary signal voltage, is indicated as $V_s$ in FIG. 1. A signal network resistor 3 is connected across terminals 1 and 2 and is in parallel with the voltage-integrating network 12, which is also connected across terminals 1 and 2. The voltage-integrating network 12 is designed to integrate the voltage between terminals 2 and 1 with respect to time and to register the result as an analog voltage signal on output lead 70 and wire 52 at contact 10. In the operation of bridge 56 without this invention, bridge 56 would normally be balanced at the start of an integration cycle. This would mean that there would be no current flow or voltage potential between second primary signal terminal 2 and first primary signal terminal 1 if the bridge were balanced. That is, $V_s$ would normally be equal to zero. Using this invention, however, the bridge is initially biased so that $V_s$ is not initially equal to zero.

At the start of an integration cycle using this invention, switch 8 is closed and the bridge 56 is biased at an offset voltage to compensate for the drift of the integrating network 12. Bridge 56 is first balanced by closing switch 9 against contact 60 and switch 26 against contact 67. This sets up a closed circuit in the output amplifier system 50 from variable voltage source 20 through output amplifier 53, wire 61, switch 9, contact 60, and wires 59 and 58. Variable voltage source 20 creates a voltage input to output amplifier 53 which results in an output voltage on the command signal output lead 54. This voltage on lead 54 activate servomotor 51 and drives the voltage source 20 to zero since the input circuit formed is a short circuit. Servomotor 51 also drives the pen 80 of pen recorder 81 to a zero reading. Once the voltage at variable voltage source 20 reaches zero, switch 26 is then changed to contact termination 24 of primary signal servomotor 23. This connects primary signal servomotor 23 to output amplifier system 50. Since there is a zero reading on command signal output lead 54, servomotor 23 alters the position of contact 68 on resistor 27 of bridge 56 and thereby balances bridge 56 bringing voltage $V_s$ to a value of zero. Switch 9 is then closed to touch contact 11 which connects the drift-compensating voltage source 13 to the output amplifier system 50. Because the voltage $V_c$ acts upon output amplifier system 50, there is a voltage input to amplifier 53. This results in a voltage on command lead 54 which activates servomotor 23 to adjust the position of contact 68 along resistance 27 to the extent that bridge 56 is no longer balanced but has an initial primary signal network voltage $V_s$ equal in magnitude to the voltage $V_c$. Servomotor 23 operates so that the polarity of $V_s$ opposes the polarity of the normal primary signal voltage which occurs across terminals 1 and 2 during the operation of this analogue integration apparatus.

$V_c$ maybe adjusted by moving contact 69 of wire 64 along resistance 15 so that $V_c$ is exactly equal to the drift voltage which will occur in the integrating network 12. The primary signal network voltage $V_s$ will then be offset from what it would otherwise by by an amount $V_c$ equal to the drift voltage which occurs in integrating network 12.

After introducing the bias into $V_s$, switch 26 is closed against terminal 67, switch 9 is closed to touch the contact 10, and switch 8 is opened. The voltage-integrating network lead 70 is thereby connected to the output amplifier system 50, whereby the integration of bridge output voltage $V_s$ is registered on the pen recorder 81. The switches 26, 9, and 8 can be mechanical switches or relays which are operated automatically or manually. Switch 8 can be closed in order to reset the operational amplifier 4 in the voltage-integrating network 12. When switch 8 is closed, the amplifier output voltage $V_0$ drops to zero. The voltage-integrating network 12 may be reset at any time, but is usually done while the bridge 56 is being balanced and biased as has previously been described.

The switches 8, 9, and 26 may be operated from a programmed timer, such as timer 37 in FIG. 2. The apparatus in FIG. 2 is a specialized application of this invention. In FIG. 2 the invention is in the form of an apparatus used for quantitatively measuring the percentage of each component of a fluid stream by integrating a primary signal voltage with respect to time across an electrical bridge where the primary signal voltage is dependent upon the quantity present of each of the components of the fluid stream. This apparatus used to accomplish this is a chromatographic analyzer of the type known as a boiling point monitor. A distillation curve is displayed on the pen recorder for each cycle of the monitor and the monitor is used for sampling a fluid hydrocarbon stream in a fractionating column in the refining of petroleum products. The bridge 56' of FIG. 2 is very similar in design and operation to bridge 56 of FIG. 1. All other major components of the embodiment of FIG. 2 are included intact from the embodiment of FIG. 1. Bridge 56' is a bridge for detecting changes in thermal conductivity of a gas stream passing across resistor 34' which, along with part of resistor 27, comprises part of a leg of bridge 56'. This change of thermal conductivity is a direct indication of a changing quantitative composition of the various components of a hydrocarbon sample taken from a petroleum-fractionating column.

Referring now to FIG. 2, there is shown a chromatographic column 46 of the type known as a gas-liquid chromatographic column or a partition column. Chromatographic column 46 contains a partitioning liquid that selectively retards passage of components of a sample from a fluid hydrocarbon stream. The partitioning liquid is mounted on a solid support having a high surface area, such as ground firebrick. Sample injection valve 47 is connected to chromatographic column 46, and a carrier gas inlet pipe 48 and a sample inlet pipe 49 pass upward to meet sample injection valve 47. Sample injection valve 47 has a perforated block 84 which can be shuttled back and forth within a cavity 85 and which is capable of capturing a hydrocarbon sample of reproducible size as introduced from pipe 49. Block 84 is moved back and forth within cavity 85 as air pressure is allowed to push against one end or the other of block 84. The air pressure is gated to the opposing ends of sample injection valve 47 by an injection solenoid 83 which is operated by timer 37. Normally a hydrocarbon stream flows from sample inlet pipe 49, through the sample injection valve 47, and out to an exhaust pipe 44. At the start of each sampling cycle, however, sample injection valve 47 encapsulates a hydrocarbon sample from inlet pipe 49 and directs the sample into chromatographic column 46. The sample is carried into chromatographic column 46 by a flow of carrier gas entering sample injection valve 47 through carrier gas inlet pipe 48. A carrier gas, such as helium, is introduced into carrier gas inlet pipe 48. The carrier gas passes through pipe 48 as well as into a pipe 45 branching from pipe 48. A needle valve 71 regulates the flow of gas through branch pipe 45 and a flow control valve 86 regulates flow through pipe 48.

From pipe 48, the carrier gas passes through sample injection valve 47 into chromatographic column 46 and then into a cavity 40 in a temperature controlled detector block 38, and out through an outlet duct 41. At the same time, a fluid hydrocarbon stream of an unknown quantitative composition is passed into inlet pipe 49 and out through exhaust pipe 44 through a direct passage in sample injection valve 47. The qualitative composition of the hydrocarbon stream in pipe 49 is initially unknown but can be determined once the various components from a sample of the hydrocarbon stream are first dissolved in and then eluted from the partitioning liquid in duct 46. This is possible by properly selecting a partitioning liquid which will selectively release sample components at relatively long intervals in the order of the boiling points of the components. The interval between the release of successive sample components distinguishes one component from another even though the boiling points of successive components may be too close to effect distinguishable separation by distillation. To provide efficient elution of the sample after injection, the chromatographic column 46 is heated at a programmed rate. As the helium carrier gas from pipe 48 leaves the sample injection valve 47 and the chromatographic column 46, it carries with it the sample components injected by sample injection valve 47 sequenced according to their respective boiling points. The carrier gas and sequenced sample components flow into cavity 40 of detector block 38 and exhaust from detector block 38 through outlet duct 41.

In addition to cavity 40, the detector block 38 contains another cavity 39 into which a quantity of helium carrier gas is introduced through branch pipe 45 from carrier gas inlet pipe 48. This quantity of carrier gas does not pass through sample injection valve 47 and contains no hydrocarbon stream sample components. This quantity of carrier gas from branch pipe 45 uses as a reference stream and exhausts from cavity 39 through an outlet duct 42.

The variable resistors 33 and 34 in bridge 56 of FIG. 1 are replaced by resistance filaments 33' and 34' in FIG. 2 respectively, and a power lead 62' from power source 35 is connected therebetween. Resistance filament 33' is positioned within 39 and resistance filament 34' is positioned within cavity 40 in detector block 38. Current from power source 35 which passes through the filaments 33' and 34' heats the filaments while the helium carrier gas which flows over them carries away some of the heat until an equilibrium condition is reached. The bridge 56' is adjusted to balance at this equilibrium condition. Filament 34' is in the chromatographic column effluent carrier gas stream which periodically contains the sequential components of the sample, and filament 33' is in a pure helium stream. As a sample component is eluted from chromatographic column 46, it flows over filament 34', removing less heat than does a pure helium stream, and bridge 56' becomes unbalanced because the resistance of filament 34' increases. The elution times are held constant by fixing the starting temperature and programmed heat rate of chromatographic column 46 so that a fixed time after sample injection will always represent the same boiling temperature. Flow variations and temperature variations of the helium carrier gas originally introduced into pipe 48 will affect the resistances of both filament 33' and filament 34'. Since chromatographic column 46 selectively and sequentially retards the passage of various fluid components of the hydrocarbon sample, the quantity of each component in the sample can be determined by the relative change which it causes in the resistance of filament 34' with respect to filament 33' at a given time after sample injection, since the moment at which a component having a given boiling point will be admitted to and leave cavity 40 can be predetermined. This predetermination is governed by timer 37 which operates injection solenoid 83 and by automatically or manually standardizing the flow rate of carrier gas through flow control valve 86. The portion of the apparatus discussed thus far in conjunction with FIG. 2 is well known as a chromatographic analyzer of the type known as a boiling point monitor.

As the various sample components enter the cavity 40 in detector block 38, they change the electrical resistance of filament 34' relative to filament 33', thereby unbalancing bridge 56' and changing the primary signal voltage $V_s$. As was explained in conjunction with FIG. 1, the error due to drift in the integrating network 12 must be eliminated in order for the output voltage $V_O$ of the voltage-integrating network to be the integral with respect to time of the input voltage $V_s$. This error is eliminated in the apparatus of FIG. 2 in the same way that it is in the apparatus of FIG. 1. That is, the drift-compensating voltage source 13 is used to bias bridge 56' from a balanced position by an amount equal to the drift-compensating voltage. In addition, the timer 37 sequences the operation of the switches 8, 26 and 9. At the start of each cycle, the chromatographic bridge 56' is automatically biased at a fixed voltage $V_c$ which will offset the integrator drift voltage developed in the voltage-integrating network. With switch 26 in contact with terminal 67, switch 9 is closed to contact terminal 60. This drives the variable voltage source 20 and the pen 80 of pen recorder 81, to zero. Switch 26 is then closed to contact termination 24 which connects the primary signal servomotor 23 to the output amplifier system 50. This causes the primary signal network (bridge 56') to become balanced. Switch 9 is then closed to touch contact 11 which connects the drift-compensating voltage source 13 to the output amplifier system. A drift-compensating voltage $V_c$, as induced by the drift-compensating source, causes the primary signal servomotor 23 to adjust the location of contact 68 along the resistor 27 until the bridge or primary signal voltage $V_s$ is initially equal to the voltage $V_c$ which, when integrated, is equal and opposite to the drift voltage which will occur in the integrating network 12. Since the voltage $V_c$ has previously been computed to be equal to the first derivative with respect to time of the drift voltage induced in the integrating network 12, the primary signal terminals 2 and 1 are now initially set at a fixed offset voltage which will compensate for the inherent voltage drift. Because the drift-compensating voltage source 13 is adjustable, $V_c$ can be changed to reflect variations which occur in the drift voltage over long periods of operation and at different operating conditions. To start each operation cycle after the initial biasing of the primary signal network, switch 9 is once again connected to contact 10 to connect the output voltage lead 70 through wire 52 to the output amplifier system 50 for recording the integration of $V_s$ by the pen recorder 81, and switch 26 is closed against termination 67 to actuate the pen recorder 81. As the first fluid component enters cavity 40, a voltage is induced across bridge 56' and the integral of this voltage, as diminished by the integral of the biasing voltage $V_c$ and as enhanced by the drift voltage of integrating network 12, appears as a voltage $V_O$ at the output of the amplifier 4. $V_O$ is attenuated by output resistor 17 and is recorded by a pen recorder 81. The switch 8 remains in the open condition until all of the fluid components have been measured. Afterwards, switch 8 closes to reset the voltage-integrating network.

While the apparatus for quantitatively measuring components of a fluid stream is well known in the art, the improvement disclosed herein improves the accuracy of the data received in such a measurement. The embodiment of is invention depicted in Fig. 2 may therefore be considered as an improvement upon this previously known apparatus.

The foregoing description and illustrations of the invention disclosed in this application are for purposes of illustration only, and no unnecessary limitations as to the scope or use of this invention should be construed therefrom.

I claim as my invention:

1. An analogue integration apparatus for integrating a primary signal with respect to time comprising:
   a. a primary signal network for generating a primary signal voltage and having second and first primary signal terminals connected to each other by a signal network resistor,
   b. a voltage-integrating network connected across said primary signal terminals and having an output voltage lead,
   c. a drift-compensating voltage source, for producing an electrical potential to offset drift developed in said voltage-integrating network, having a first compensating voltage lead connected to said second primary signal terminal, and having a second compensating voltage lead,
   d. an output amplifier system having an output amplifier with a command signal output lead terminating in a two-way switch, and a variable voltage source connected in series with said output amplifier between said first primary signal terminal and a three-way switch that is connectable to said output voltage lead, said first primary signal terminal, and said second compensating voltage lead,
   e. a voltage-adjusting servomotor connectable to said two-way switch and connected to said first primary signal terminal and operably connected to said variable voltage source, whereby said variable voltage source is adjustable to effect a zero voltage input into said output amplifier, and f. a primary signal servomotor connected to said first primary signal terminal and connectable to said two-way switch and operably connected to said primary signal network, whereby said primary signal network is adjustable to effect a voltage differential between said second and first primary signal terminals equal and opposite in polarity to voltage at said drift-compensating voltage source.

2. The apparatus of claim 1 further characterized in that said voltage-integrating network is comprised of a resistor followed by an operational amplifier and a capacitor connected in parallel with each other, and a switch leading to ground connected to said resistor to bypass said operational amplifier and said capacitor.

3. The apparatus of claim 2 further characterized in that said drift-compensating voltage source is adjustable.

4. The apparatus of claim 1 further characterized in that said primary signal network is an electrical bridge having two branches, and said signal network resistor is connected to said second and first primary signal terminals between said branches of said bridge.

5. The apparatus of claim 1 further characterized in that an attenuation network is connected across said first primary signal lead and said output voltage lead, and a pen recorder is connected to said attenuation network and the integral with respect to time of voltage from said primary signal network is graphically recorded.

6. In an apparatus for quantitatively measuring the percentage of each component of a fluid stream by integrating a primary signal voltage with respect to time across an electrical bridge where said primary signal voltage is dependent upon the quantity present of each of the aforesaid components, the improvement comprising:

a. a Wheatstone bridge for generating said primary signal voltage having second and first branches and second and first primary signal terminals in said second and first branches respectively, and a signal network resistor connecting said second and first primary signal terminals to each other, b. a voltage-integrating network connected across said primary signal terminals and having an output voltage lead, c. a drift-compensating voltage source, for producing an electrical potential to offset drift developed in said voltage-integrating network, having a first compensating voltage lead connected to said second primary signal terminal, and having a second compensating voltage lead, d. an output amplifier system having an output amplifier with a command signal output lead terminating in a two-way switch, and a variable voltage source connected in series with said output amplifier between said first primary signal terminal and a three-way switch that is connectable to said output voltage lead, said first primary signal terminal, and said second compensating voltage lead, e. a voltage-adjusting servomotor connectable to said two-way switch and connected to said first primary signal terminal and operably connected to said variable voltage source, whereby said variable voltage source is adjustable to effect a zero voltage input into said output amplifier, and f. a primary signal servomotor connected to said first primary signal terminal and connectable to said two-way switch and operably connected to said Wheatstone bridge, whereby said Wheatstone bridge is adjustable to effect a voltage differential between said second and first primary signal terminals equal and opposite in polarity to voltage at said drift-compensating voltage source.

7. The apparatus of claim 6 further characterized in that said voltage-integrating network is comprised of a resistor followed by an operational amplifier and a capacitor, connected in parallel with each other, and a switch leading to ground connected to said resistor to bypass said operational amplifier and said capacitor.

8. The apparatus of claim 6 further characterized in that said drift-compensating voltage source is adjustable.

9. The apparatus of claim 6 further characterized in that an attenuation network is connected across said first primary signal lead and said output voltage lead, and a pen recorder is connected to said attenuation network, whereby the integral with respect to time of voltage from said primary signal network is graphically recorded.